United States Patent [19]

Koeck et al.

[11] 4,434,326
[45] Feb. 28, 1984

[54] CIRCUIT ARRANGEMENT FOR ESTABLISHING AND TERMINATING A DATA CONNECTION

[75] Inventors: Klaus Koeck, Banknang; Wolfgang Bambach, Oberstenfeld; Gerhard Ruopp; Frank Mikley, both of Backnang, all of Fed. Rep. of Germany

[73] Assignee: Licentia Patent-Verwaltungs-GmbH, Frankfurt, Fed. Rep. of Germany

[21] Appl. No.: 286,584

[22] Filed: Jul. 24, 1981

[30] Foreign Application Priority Data

Jul. 25, 1980 [DE] Fed. Rep. of Germany ....... 3028236

[51] Int. Cl.³ .......................................... H04M 11/08
[52] U.S. Cl. .................................. 179/2 DP; 179/2 C
[58] Field of Search .................. 179/2 C, 2 DP, 2 TV, 179/81 R; 358/85

[56] References Cited

U.S. PATENT DOCUMENTS 3,959,778  5/1976  Yves-Jean Brette .
4,150,254  4/1979  Schussler et al. ................ 179/2 TV
4,291,200  9/1981  Smith ........................... 179/2 DP X

FOREIGN PATENT DOCUMENTS 2536200   2/1977   Fed. Rep. of Germany .
2814837   5/1979   Fed. Rep. of Germany .
2823283  11/1979   Fed. Rep. of Germany .
2840845   4/1980   Fed. Rep. of Germany .
2931436   4/1980   Fed. Rep. of Germany .
2931529   2/1981   Fed. Rep. of Germany ... 179/2 TV
2942441   4/1981   Fed. Rep. of Germany .

OTHER PUBLICATIONS

Melvin, Donald K.; *LSI Applications in Telephone Instruments*; Proceedings of the National Electronics Conference; vol. 32, Chicago, Ill., USA, (16–18 Oct. 1978), pp. 261–266.
*Electronic Technology*, vol. 15, No. 7, Jul./Aug. 1981, pp. 125–128; "Microprocessor Peripheral for Viewdata" by R. E. F. Bugg.
"Bildschirmtext–Beschreibung des Teilnehmergerätes und der Datenübertragungseinrichtung" by Bambach et al., *Techn. Mitt AEG-Tel 69(1979), 4, pp. 136–140.*
"Automatically Restarting a Microprocessor After Power Failure", Beaston, 699, *Control Engineering*, vol. 25, No. 12, (1978.12), pp. 84–85.
Article by Banbach, Koeck, Schüssler, "Telecommunications Practice," vol. 56/1979, No. 24.

*Primary Examiner*—G. Z. Rubinson
*Assistant Examiner*—Keith E. George
*Attorney, Agent, or Firm*—Spencer & Frank

[57] ABSTRACT

In a circuit arrangement for establishing and terminating a connection in a subscriber communication system, the arrangement including a data transmission device arranged to be connected to an associated subscriber line of the system and including a data terminal, a line connection device fed by the terminal, an automatic dialing device, a current supply fed through the subscriber line and a control device for performing and monitoring the sequence of individual operating states of the data transmitting device, a memory unit is connected for storing a representation of at least one operating state of the data transmission device.

9 Claims, 3 Drawing Figures

CIRCUIT ARRANGEMENT FOR ESTABLISHING AND TERMINATING A DATA CONNECTION

BACKGROUND OF THE INVENTION

The present invention relates to a circuit arrangement for establishing and terminating a connection with the aid of a data transmission device.

Such arrangements have become known, for example, as video text modems, in the development and planning of a new service, in Great Britain called viewdata such as disclosed, for example, in Federal Republic of Germany patent application Nos. P 28 23 283, 28 40 845 and 29 42 441 and in an article entitled "Funktion der Teilnehmereinrichtungen für Bildschirmtext" [Operation of Subscriber Devices for Video Text] by Bambach, Koeck, Schüssler, in Fernmeldepraxis [Telecommunications Practice], Volume 56/1979, No. 24.

Such video text modems, which are equipped with automatic selection, or dialing, devices, together with a television receiver equipped for video text reception, allow the owner or user of a telephone terminal to be provided with the new viewdata service over his telephone line. However, telephone conversations and video text reception are possible only alternatively.

In view of a requirement by the Federal Postal Service of the Federal Republic of Germany, video text modems must be equipped with a current supply which is independent of the electric power utility service; they are therefore fed through the subscriber's telephone connection line itself.

When establishing a video text connection it is possible that temporary supply current interruptions or reductions occur which may have the result that the establishment of the connection is interfered with and the subscriber may have to restart the procedure. Depending on the time spent by the individual subscriber in such a case, this may occupy important parts of the exchange equipment for unnecessarily long periods of time. This aspect is of particular importance when video text modems are used in automatic branch exchanges.

SUMMARY OF THE INVENTION

It is therefore an object of the present invention to provide a circuit arrangement of the above-identified type which, while involving a low cost, makes it possible to successfully continue the establishment of a connection after an interruption in the supply current or to automatically restart the establishment of such a connection.

The above and other objects are achieved, in accordance with the present invention, in a circuit arrangement for establishing and terminating a connection in a subscriber communication system, the arrangement including a data transmission device arranged to be connected to an associated subscriber line of the system and including a data terminal, a line connection device fed by the terminal, an automatic dialing device, a current supply fed through the subscriber line and a control device for performing and monitoring the sequence of individual operating states of the data transmitting device, by further providing the data transmission device with a memory unit connected for storing a representation of at least one operating state of the device.

Although it has been proposed to enlarge the energy storage capability for the current supply of the data transmission device, such necessary enlargement would be in the amount of at least one to two orders of magnitude so that long current interruptions of up to several seconds, when an extension is not disconnected from the exchange, can be bridged and would therefore require a large amount of space. Moreover, it has already been proposed to supply the data transmission device with additional current from the alternating voltage power mains. However, this has the drawback that complicated lightning protection measures must be provided.

The solution according to the invention offers the advantages that, at low cost and without the requirement for a voluminous energy storage component, a data connection can be successfully continued or reestablished in the shortest possible, energy saving manner after the supplying loop current was interrupted without the central exchange being occupied for an unnecessarily long time.

DESCRIPTION OF THE PREFERRED EMBODIMENTS

Figure 1:
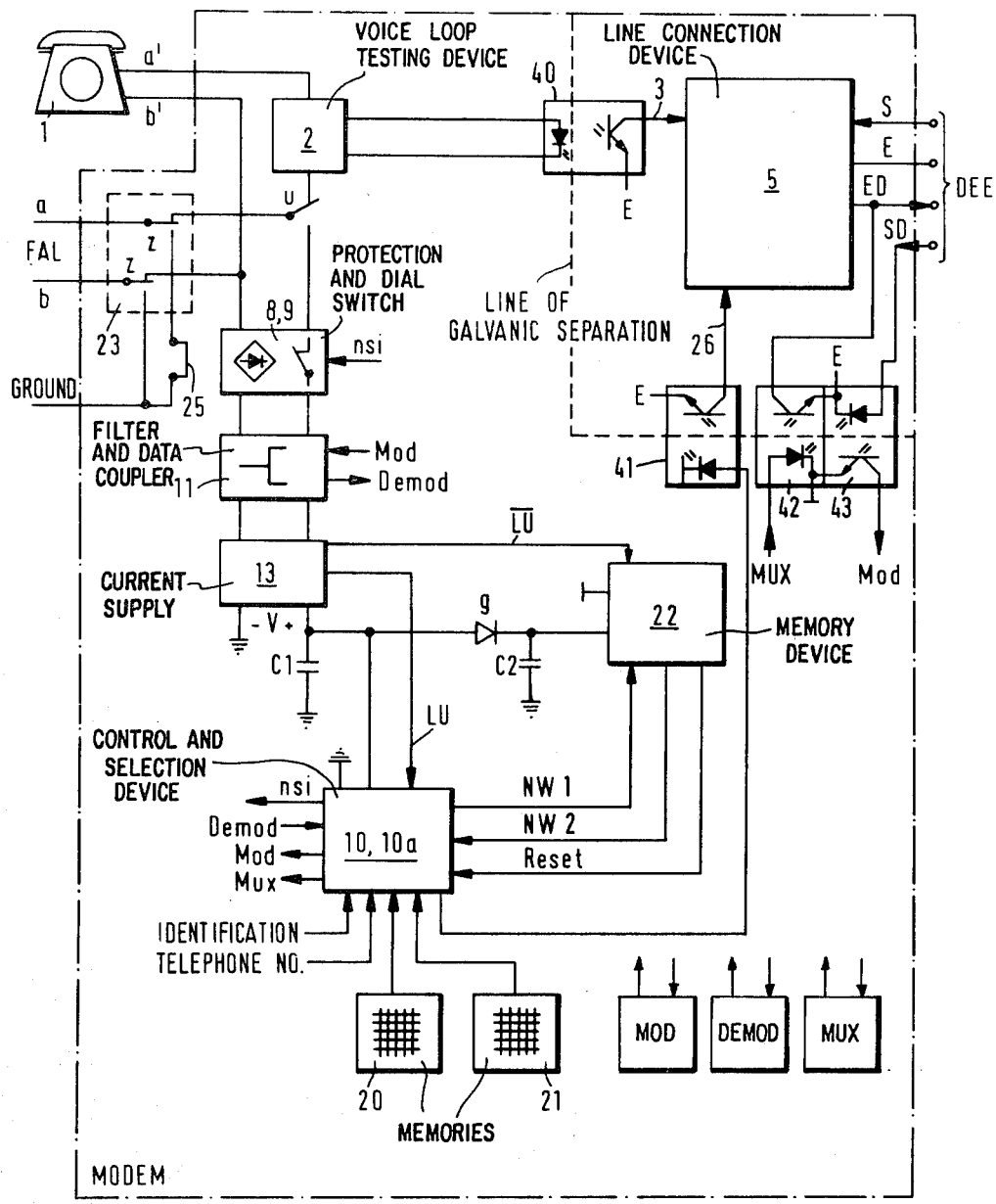
FIG. 1 is a circuit diagram of a connection device according to the invention for a video text modem.

The dash-dot block in FIG. 1 encloses a video text modem which is also suitable for use in telephone extensions and is connected to the wires a and b of a telephone connection line FAL and to ground, if necessary. The modem is connected with an associated telephone instrument 1 via wires a' and b' and is connected to a data end device, or terminal, DEE, here a video text device, via four lines: S, for control and current supply; ED, for received data; SD, for transmitted data; and a return line E.

The video text modem includes a line connection device 5 which is fed by the video text device via lines S, E and ED and which has an input line 3. The modem further includes the following function blocks, all of which are known, which are fed through the telephone connection line FAL: a voice loop testing device 2; a polarization reversal protection and dial switch 8, 9; a filter and data coupler 11; a current supply circuit 13 for obtaining a supply voltage from the loop current; a sequence control with automatic selection device 10, 10a; a demodulator DEMOD; a modulator MOD; a multiplexing device MUX; and two memories 20, 21 for storing identification and telephone numbers. Other blocks, without significance for the invention, are not shown in FIG. 1.

The device DEE and line connection device 5 are electrically isolated from the remainder of the modem, thereby providing overvoltage, or current surge, protection. The transmission of control and information signals therebetween is effected via a plurality of light transmission paths, or couplers, 40–43, each composed of a light-emitting diode providing the coupler input and a phototransistor providing the coupler output. The memory device 22 according to the invention for storing representations of one or more operating states of the data transmission device is connected, via a rectifier g and a shunt-connected charging capacitor C2, and the control line LU with the output of the current supply 13 and, via control lines NW1, NW2 and $\overline{\text{Reset}}$, with the device 10, 10a.

The circuit operates as follows:

If actuation of a "Dial" key at the remote control device of the data end instrument DEE initiates the establishment of a connection, a supply voltage is applied through line S to the line connection device 5, which is thus actuated. Device 5 can then respond to signals supplied by the voice loop testing device 2 to line 3 via a light transmission path to determine whether the telephone number is busy or not. If the number is busy, a signal is generated by the voice loop testing circuit 2 within 1.5 seconds after application of a supply voltage via line S and is transmitted by the line connection device 5 to the data end device DEE, is evaluated there and causes the voltage on S to be switched off.

If the number is unoccupied, the modem is connected in that the switching contact of a relay U of the line connecting device 5 is excited and wire a is connected, via the switching contact u of that relay, to the loop input of the polarization reversal protector 8 or to the dial switch nsi (9).

The dial switch nsi is normally closed. In dialing state the switch is cyclically opened controlled by the dialing control 10a.

Once the operating voltage has been built up, the procedure of establishing a connection follows and after a short waiting period, the device 10, 10a provides the digits of one or possibly several ten-digit call numbers from the telephone number memory and generates dialing pulses for the nsi contact. After completion of the establishment of the connection, several audible sounds as well as modem identifications and code words are exchanged between the selected central video text exchange and the video text modem and, if the test result is positive, data transfer is made possible.

If now during the establishment of the connection there is an interruption or a break in the loop current, a signal is generated by current supply device 13 and applied through line LU to the device 10 to which power continues to be supplied, for a short period of time, of the order of magnitude of 200 msec, by the capacitor C1. During this time, the sequence control device 10 reads in, via output line NW1, a representation of the current operating state to the memory device 22. Then the sequence control device 10 is set, by signals supplied by the memory device 22 via control line NW2 and line $\overline{\text{Reset}}$ into a defined basic state so as to prevent error functions due to the disappearance of voltage across the capacitor C1 or in the sequence control 10.

Upon the return of the supply voltage, the Reset signal is removed again by the memory device 22. Then the sequence control 10 interrogates the operating state memories of the memory device 22 and the sequence control device is returned to the stored starting operational state.

In one embodiment of the invention, the charging capacitor C2 and corresponding switching means at the input of the memory device 22, which is advantageously built up of CMOS circuits, are dimensioned in such a way that the operating state memories are automatically returned to their starting state, ready for initiation of a connection, when a certain settable period of line interruption, e.g. 10 seconds, is exceeded, so that it becomes possible to establish a new connection.

This also permits the use of the arrangement according to the invention in telephone branch exchanges in which, before the telephone subscriber is actually dialed, a line to the central exchange has to be reached.

There exist three conventional procedures for doing this:
1. Dialing one or a plurality of identifying numbers;
2. Actuating a ground key; and
3. Acutuating a so-called flash key.

To select and set the appropriate procedure, the present invention provides a selection arrangement 20.

This selection arrangement can advantageously be realized as a selection matrix with wire bridges or switches. The sequence control device 10 is connected with this selection arrangement 20 and, if there is a desire for a data connection, generates the corresponding operating state steps. Advantagously the control device 10 is realized as a microprocessor control with PROM (programmable read only memory) or EPROM (electrically programmable read only memory), so that the current consumption of the modem can be held very low.

If the modem according to the invention is used in extensions requiring the above-mentioned procedure 1, an embodiment of the invention provides a further memory 21 for storing identification or pause sequences. The identification or pause sequences may, however, also be stored in the telephone number memory which is provided in any case and which requires only a few additional operating state steps in the sequence control device 10, 10a since then the identification number preselection can be effected in the same manner as the dialing of the telephone number of a distant subscriber.

When the arrangement according to the invention is used in extensions with operator connection by actuation of a ground key, whereby both wires a and b are connected to ground, two relay switching contacts z are provided which may be constituted by switching or operating contacts.

FIG. 1 shows a switch 23 containing the contacts z. A switch formed of relay contacts is preferred in a semiconductor structure including, for example, a self-blocking field effect transistor or a VMOS element because: firstly, a relay contact constitutes an ideal short-circuit contact with a resisitance of max. 1 ohm; secondly, the problem of additional lightning protection, if semiconductor elements are used, is eliminated and, thirdly, a relay simultaneously brings about the requisite electrical separation if its excitation current is furnished by the line connection unit 5 and thus by the video text device, i.e. not from the central exchange, so that an additional light transmission path between the exchange loop and the line connection device 5 is not required.

The above also applies for the procedure to reach a line to the central exchange by actuation of a flash key which causes the loop current to be interrupted for a defined period of time, e.g. 80 msec. According to the present invention, this loop interruption is also effected by means of a pair of relay contacts z and if the relay contacts are realized as switching block 23, as shown in FIG. 1, the bridge 25 must be opened.

Figure 2:
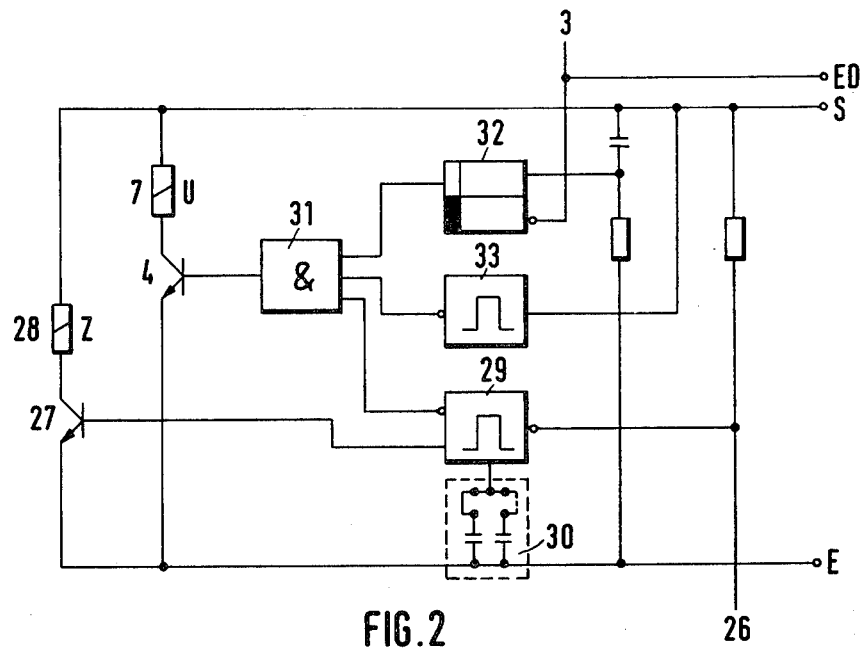
FIG. 2 is a circuit diagram of a preferred embodiment of the line connection device according to the invention.

FIG. 2 shows one embodiment of the line connection device 5 according to FIG. 1. It essentially includes a flip-flop 32, two monostable multivibrators, or monoflops, 33 and 29, an AND-linkage member 31 having three inputs connected, respectively, to the output of the flip-flop 32 and the negated, or complement, outputs of the two monoflops 33 and 29, the actuating coil 7 of relay U connected in series with a switching transistor 4 whose base is actuated by the output of the AND-member 31, so that an output signal from member 31 drives transistor 4 into conduction, and the actuating coil 28 of relay Z also connected in series with a switching transistor 27 whose base is connected to the direct output of the second monoflop 29 so that a signal at that output drives transistor 27 into conduction.

The circuit shown in FIG. 2 operates as follows:

If a connection is to be established, voltage is applied across the line connection device 5 between the control and current supply line S and the return line E. This causes the flip-flop 32 to be set and the monostable multivibrator 33 to be triggered. If the associated line turns out to be occupied, a pulse is generated by the associated voice loop testing device 2 within 1.5 seconds after application of the voltage between lines S and E, which pulse resets the flip-flop 32 via input 3. If, however, the line is available, the second input of the AND member 31 is also set at the end of the on period of the monostable multivibrator 33, so that if the third input is also set, the switching transistor 4 is controlled to be conductive by the output of the AND member 31 and the switching relay U is excited.

For the operator connection procedures with ground or flash key, a short trigger pulse is emitted by the sequence control device 10, via light transmission path 41, to the negated input 26 of the second monostable multivibrator 29, so that the switching transistor 27 is actuated by the output of the second monostable multivibrator 29 and the relay Z is excited. At the same time, the AND condition at the AND member 31 is cancelled via the negated output of the second monostable multivibrator 29, so that the switching relay U is deactuated. This has the advantage that the current furnished by the video text end instrument DEE is fully available to the ground or flash key simulation relay Z. This is of great significance because the control line S cannot have a voltage of more than 4 V, which closely limits the available switching power.

After the end of the switching period of the second monostable multivibrator 29 which can be varied by a setting device 30 by means of capacitors and bridges, the relay Z is switched off again and the switching relay U is switched in correspondingly.

Of course, the arrangement according to the invention does not remain limited to a single ground key simulation; with the appropriate setting of the sequence control device 10, it is also possible to perform, for example, two ground key simulations separated by a defined pause to connect the operator.

The circuit component 10 can be realized by a microcontroller, for instance 1802 system RCA.

The circuit component 10a controls the automatic dialing contact nsi and can be realized by the same microcontroller extended by software.

The memory components 20 and 21 can be realized by a diode matrix, programming field or an EPROM 6654 Intersil.

Figure 3:
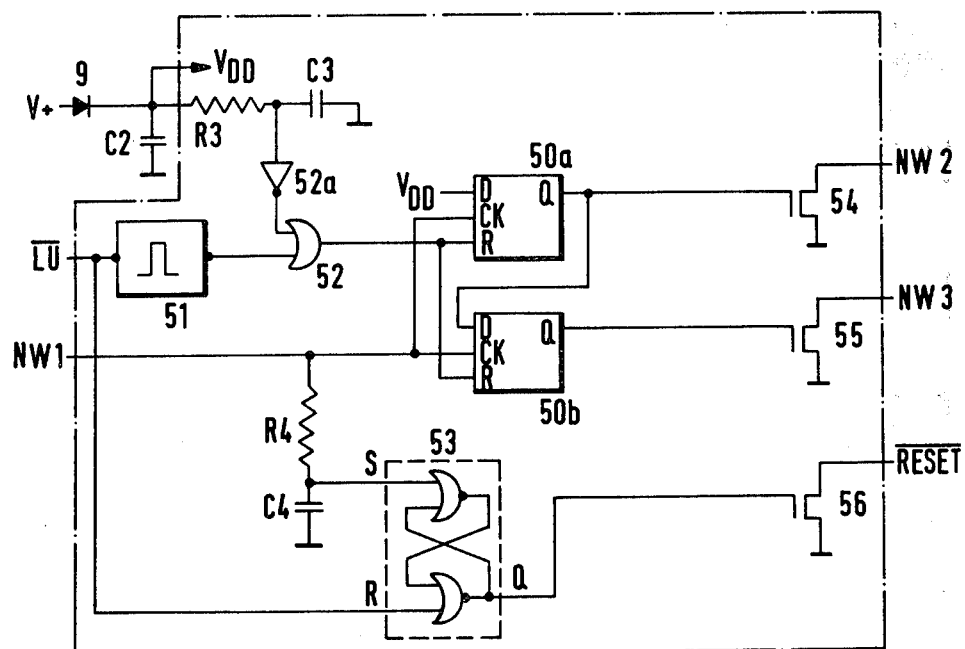
FIG. 3 is a circuit diagram of a preferred embodiment of the operating state memory device 22 (FIG. 1) according to the invention.

FIG. 3 shows a solution of the operating state memory device 22 according to the invention. It consists of two flip-flops 50a, 50b, a monoflop 51⇌, which can be retriggered and determines the "remember time" of the device 22 (to be realized by an astable multivibrator and a counter e.g.); a 1ms-time delay R4, C4; a RS-latch 53, three transistors (open drain) 54, 55 and 56; the power supply entrance $V_{DD}$, the time delay R3, C3 (Power-on Reset), the OR-gate 52 and an inverter 52a.

All functions are realized in CMOS-technology, so that a current consumption of max. 10 μA results. To receive a remember time of 10 seconds the value of C2 must be 33 μF for $V_{DD}=4$ volts.

The device functions are now described. If V+ is switched on for the first time the 2 flip-flops 50a, 50b are reset. The sequence control device 10 detects the loop current interruption by the control signal LU of the power supply 13. At the same time the mono-flop 51 is started. If the loop current interruption is shorter than 200 msecs there will be no reaction of the control device 10. If the low current interruption is longer than 200 msecs the actual operation state is stored in the flip-flops 50a, 50b by the control line NW1. The flip-flop 50a is set by one positive slope on NW1, both flip-flops 50a, 50b are set by two positive slopes on NW1. Afterwards the signal NW1 remains on high level. After the 1 msecs time delay R4, C4 the RS-latch 53 is set. Then Reset=0 resets the control device 10. If the loop current interruption is finished the control signal LU=1 resets the RS-latch 53. Then the sequence control device 10 starts to operate by the control signal Reset=1. By interrupting the states of NW2 and NW3 the right operation state is detected and establishing the data connection is continued. If the loop current interruption lasts longer than 10 seconds the memory time of the mono-flop 51 has run down and the flip-flops 50a, 50b are reset. Now a new establishment of a data connection can be started.

It is to be understood that the above description of the present invention is susceptible to various modifications, changes and adaptations, and the same are intended to be comprehended within the meaning and range of equivalents of the appended claims.

What is claimed is:

1. In a circuit arrangement for establishing and terminating a connection in a subscriber communication system, the arrangement including a data transmission device arranged to be connected to an associated subscriber line of the system and including a data terminal, a voice loop testing device connectable to the subscriber line, a line connection device supplied with operating voltage by the terminal, and connected to receive signals produced by the voice loop testing device, an automatic dialing device, a current supply connected to receive operating voltage from the subscriber line, a control device connected in the data transmission device and to the automatic dialing device for performing and monitoring the sequence of individual operating states of the data transmission device, and a memory unit connected to the control device for storing a representation of the present operating state of the data transmission device, the improvement wherein: the operating state representations stored in said memory unit are those required for reestablishment of an existing connection; and, said control device constitutes means responsive to a temporary interruption in the supply of operating voltage to said current supply from the subscriber line for reading out from said memory unit, after such interruption has ended, the representations stored therein and for then reestablishing the connection existing before such interruption.

2. Circuit arrangement as defined in claim 1 further comprising means for causing such read-out to occur with a time delay.

3. Circuit arrangement as defined in claim 1 wherein the communication system is a branch exchange where a procedure to reach a line to the central exchange has to be executed.

4. Circuit arrangement as defined in claim 3 wherein said data transmission device comprises selection means connected for controlling the procedure to reach a line to the central exchange.

5. Circuit arrangement as defined in claim 4 wherein said data transmission device further comprises a second memory unit connected for storing representations of sequences of identification numbers or pauses, respectively, for effecting the procedure to reach a line to the central exchange with identification number dialing.

6. Circuit arrangement as defined in claim 5 wherein the selection of identification numbers is effected by said automatic dialing device.

7. Circuit arrangement as defined in claim 4 wherein for reaching a line to the central exchange by way of ground or flash key actuation, said line connection device comprises switching means and a timing member connected for short-circuiting or open circuiting the wires of said subscriber line for a settable period of time after said control device supplies a starting pulse to the timing member.

8. Circuit arrangement as defined in claim 7 wherein said line connection device comprises a switching relay connected so that its current supply can be interrupted during actuation of said switching means.

9. Circuit arrangement as defined in claim 1 further comprising means connected for buffering said memory unit by current from said current supply.

* * * * *